(12) United States Patent
Takata

(10) Patent No.: US 6,816,164 B2
(45) Date of Patent: Nov. 9, 2004

(54) TEXTURE CREATING METHOD, TEXTURE CREATING APPARATUS AND COMPUTER-READABLE RECORDING MEDIUM CONTAINING TEXTURE CREATING PROGRAM

(75) Inventor: Kazuhiko Takata, Honolulu, HI (US)

(73) Assignee: Konami Computer Entertainment America, Inc., Honolulu, HI (US)

( * ) Notice: Subject to any disclaimer, the term of this patent is extended or adjusted under 35 U.S.C. 154(b) by 8 days.

(21) Appl. No.: 10/309,676

(22) Filed: Dec. 4, 2002

(65) Prior Publication Data

US 2004/0109003 A1 Jun. 10, 2004

(51) Int. Cl.$^7$ .............................................. G06F 11/40
(52) U.S. Cl. ...................................... 345/552; 345/582
(58) Field of Search ................................ 345/552, 530, 345/545, 558, 560, 561, 582, 589

(56) References Cited

U.S. PATENT DOCUMENTS

| | | | | |
|---|---|---|---|---|
| 5,812,141 A | * | 9/1998 | Kamen et al. | ............... 345/587 |
| 6,002,407 A | * | 12/1999 | Fadden | .................. 345/582 |
| 6,259,455 B1 | * | 7/2001 | Shaw et al. | ................. 345/582 |
| 6,392,655 B1 | * | 5/2002 | Migdal et al. | ............... 345/582 |

* cited by examiner

Primary Examiner—Kee M. Tung
(74) Attorney, Agent, or Firm—Jordan and Hamburg LLP

(57) ABSTRACT

A method is provided by which a texture is created by layering previously stored patterns and by applying a desired color to each layered pattern. The patterns are layered into an accumulation buffer which converts the layered patterns of selected colors into a bitmap image representative of the particular texture created by the layering and color selection process. The texture drawing is temporarily stored in the accumulation buffer, and is later mapped onto a three-dimensional model or character image for display.

9 Claims, 13 Drawing Sheets

COLOR LEGEND

TEXTURE CREATING METHOD, TEXTURE CREATING APPARATUS AND COMPUTER-READABLE RECORDING MEDIUM CONTAINING TEXTURE CREATING PROGRAM

BACKGROUND OF THE INVENTION

The present invention relates to a method for creating textures applied to images displayed on image creating apparatuses applied to video game machines which use, for example, a cassette recording medium or the like in which an optical disc, a magnetic disc, or a semiconductor memory containing program data, is used, and to texture creating methods therefor and recording media containing texture creating and recording programs.

Many game systems have heretofore been proposed, such as a system comprised of a home-use game console and a television monitor, a commercial-use game machine, and a system comprised of a personal computer or work station, a display, and a sound output device.

These game systems each generally include a player-operated controller, a recording medium containing game-program data, a central processing unit (CPU) for performing control for the generation of sound and images based on the game-program data, a processor for generating images, a processor for generating sound, a monitor for displaying images, and a speaker for outputting the generated sound. In many cases, the types of recording medium include a compact-disc read-only memory (CD-ROM), a semiconductor memory, and a cassette having a built-in semiconductor memory.

In these game systems, in general, it is often necessary to create various textures, comprised, for example, of distinctive or recognizable patterns having various color components. Conventionally, such textures are created and stored employing a bitmap rendering. These textures can be used, for example, to represent wrinkles and other surface textures or when depicting and distinguishing various ones of the player characters in a video game, for example, by configuration of different team uniform designs. In general, three-dimensional models, as objects displayed on a screen, are composed of polygons as a plurality of two-dimensional virtual triangular or square figures. The textures, conventionally comprised of two-dimensional image data, are applied to these displayed polygons. Normally, the textures to be applied to the polygons are separately set and stored beforehand in a memory as bitmap data.

Depending on the complexity of the texture and the number of colors involved, storing such bitmap data for a particular texture can require the use of a significant volume of memory and, if custom textures are to be selected by a player in advance of game play, creation of such textures can be generally inefficient and difficult to be implemented by the player.

SUMMARY OF THE INVENTION

Accordingly, it is an object of the present invention to provide a texture creating apparatus for permitting the creation of a texture to be displayed, a texture creating method therefor, and a computer-readable recording medium containing a texture creating program.

It is another object of the present invention to provide a texture creating apparatus for displaying a 3D rendering of a character incorporating such texture in a manner which reduces the required memory associated with the storage of the texture, while concomitantly simplifying the creation process of a custom texture, a texture creating method therefor, and a computer-readable recording medium containing a texture creating program.

Briefly stated, a method is provided by which a texture is created by layering previously stored patterns and by applying a desired color to each layered pattern. The patterns are layered into an accumulation buffer which converts the layered patterns of selected colors into a bitmap image representative of the particular texture created by the layering and color selection process. The texture drawing is temporarily stored in the accumulation buffer, and is later mapped onto a three-dimensional model or character image for display.

In accordance with an embodiment of the invention, the method of creating textures can also store the created textures as texture information comprised of individual layer and color data, rather than as bitmap information, thereby reducing the amount of required memory. In an advantageous embodiment, each of a plurality of patterns correspond to a particular identifying number, or identifier, such that the layer data consists merely of a particular pattern number, saving considerably on required storage. Further reduction in required memory is advantageously achieved by saving color data associated with each pattern number as a coordinate set on a two dimensional color lookup table, or color chart, rather than as a true RGB value.

In accordance with an embodiment of the invention, an apparatus for practice of the above method, advantageously incorporated as part of a game machine, permits a game player to custom select textures in advance of game play. For example, one such apparatus may permit the player or players to select a distinctive team uniform, badge or logo which will be displayed during game play to distinguish one player's game characters from an opponent's characters.

The above, and other objects, features and advantages of the present invention will become apparent from the following description read in conjunction with the accompanying drawings, in which like reference numerals designate the same elements.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DESCRIPTION OF THE PREFERRED EMBODIMENTS

Figure 1:
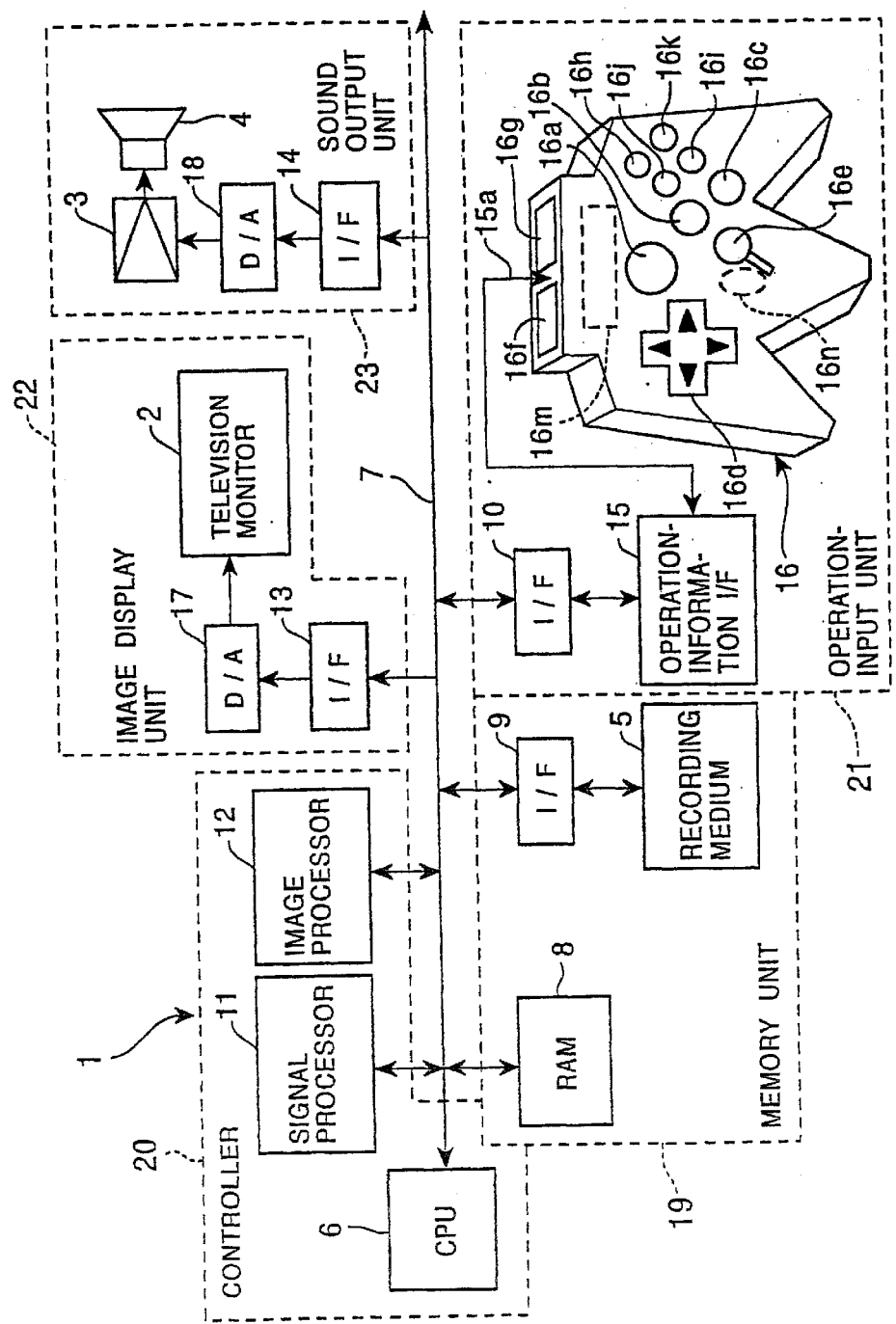
FIG. 1 is a block diagram showing a game system according to an embodiment of the present invention.

A method in accordance with an embodiment of the invention will find particular applicability for use in creating texture which is later applied to various model and/or character images displayed on a game apparatus during game play and generally referred to herein as display objects. Therefore, prior to disclosing the method of creating such textures, a description of a typical game system employing the textures created by the method in accordance with the invention is now provided, with reference to FIG. 1.

The game system 1 includes a main unit, a television (TV) monitor 2 for outputting game images, an amplification circuit 3 and a speaker 4 for outputting game sound, and a recording medium 5 containing game data comprised of images, sound, and program data. The recording medium 5 is, for example, in a preferred embodiment a CD-ROM or DVD-ROM containing the game data and the program data of an operating system. However, the invention may be implemented using any memory device capable of storing sufficient data and operating at sufficient speed to enable realistic real time operation.

In the main unit, a bus 7 comprised of an address bus, a data bus, and a control bus (not shown), is connected to a CPU 6. A random access memory (RAM) 8, interface (I/F) circuits 9 and 10, a signal processing processor 11, an image processor 12, and I/F circuits 13 and 14, are connected to the bus 7. A controller 16 is connected to the I/F circuit 10 via an operation-information I/F circuit 15. A digital-to-analog (D/A) converter 17 is connected to the I/F circuit 13, and a D/A converter 18 is connected to the I/F circuit 14.

The RAM 8, the I/F circuit 9, and the recording medium 5 constitute a memory unit 19. The CPU 6, the signal processor 11 and the image processor 12 constitute a controller 20 for controlling the progress of the game. The I/F circuit 10, the operation-information I/F circuit 15, and the controller 16 constitute an operation input unit 21. The TV monitor 2, the I/F circuit 13, and the D/A converter 17 constitute an image display unit 22. The amplification circuit 3, the speaker 4, the I/F circuit 14, and the D/A converter 18 constitute a sound output unit 23.

The signal processor 11 mainly performs computation in a three-dimensional space, computation for transformation from a position in a three-dimensional space into a position in a pseudo-three-dimensional space, illumination computation, and the generation and processing of sound data.

The image processor 12 performs, based on a result of computation by the signal processor 11, the writing of image data to be rendered in the display area of the RAM 8, for example, the writing of texture data to an area of the RAM 8 that is specified by polygons. The creation and writing of the texture data is described below.

The controller 16, for example, has a start button 16a, an A-button 16b, a B-button 16c, a cross key 16d, a control stick 16e, a left trigger button 16f, a right trigger button 16g, a C1-button 16h, a C2-button 16i, a C3-button 16j, a C4-button 16k, a connector 16m, and a depth trigger button 16n. However, it is recognized that any generic type controller permitting input by the user may be used.

A memory card or the like for temporarily storing the progress of the game can, if so desired, be set in the connector 16m.

It will be understood to those skilled in the art that the precise form of the game system 1 differs depending on its purpose. For example, in a game system 1 intended for home use, the TV monitor 2, the amplification circuit 3, and the speaker 4 are provided separately from the main unit. Where, however, the game system 1 is intended for commercial use, all the components shown in FIG. 1 are integrated in a casing.

In an embodiment incorporating the invention in which the game system 1 has a personal computer or workstation at its core, the TV monitor 2 corresponds to a display for the computer or workstation, the image processor 12 corresponds to part of the game program data recorded on the recording medium 5, or the hardware of an add-in board set in an add-in slot of the computer or workstation, and the I/F circuits 9, 10, 13, and 14, the D/A converters 17 and 18, and the operation-information I/F circuit 15, correspond to the hardware of an add-in board set in an add-in slot of the computer or workstation. The RAM 8 corresponds to the main memory of the computer or workstation, or to each area of an extension memory.

The illustrative example described above is a game system 1 intended for home use.

The operation of the game system 1 is briefly described below.

When the game system 1 is supplied with power by turning on a main-power switch (not shown), the CPU 6 reads, based on an operating system recorded on the recording medium 5, images, sound, and game-program data from the recording medium 5. A portion or the entirety of the images, sound, and game-program data read by the CPU 6 is stored in the RAM 8.

Subsequently, the CPU 6 proceeds with the game, based on the game-program data stored in the RAM 8, and on instructions input through the controller 16 by a game player. In other words, the CPU 6 generates, based on instructions from the game player via the controller 16, commands as tasks for rendering and sound output.

Based on the generated commands, the signal processor 11 performs computation of the position of a game character in a three-dimensional space (similarly in a two-dimensional space), illumination computation, and the generation and processing of sound data.

Next, based on a result of the computation, the image processor 12 performs the writing of image data to be rendered in the display area of the RAM 8. The image data written in the RAM 8 are supplied to the D/A converter 17 via the I/F circuit 13. The supplied image data are converted into analog video signals by the D/A converter 17. The video signals are supplied to the TV monitor 2, and are displayed as an image on the screen of the TV monitor 2.

The sound data output from the signal processor 11 are supplied to the D/A converter 18 via the I/F circuit 14. The supplied sound data are converted into analog sound signals, and are output as sound from the speaker 4 via the amplification circuit 3.

Next, the writing of texture data by the image processor 12 is described with reference to FIG. 1.

As described above, the signal processor 11 performs computation based on commands from the CPU 6, and the image processor 12 performs, based on a result of the computation, the writing of image data to be rendered in the display area of the RAM 8.

The RAM 8 includes a non-display area and a display area (a frame buffer). Information on the recording medium 5, such as polygon data, texture-selection data, and color data (texture data), are stored in an accumulation buffer of the non-display area.

The polygons are two-dimensional virtual polygonal figures constituting objects provided in the game space, that is, models and game characters. In the first embodiment, triangles and quadrangles are used as the polygons. The textures are two-dimensional images that are pasted on the polygons so that images are formed. The color data specify the colors of the textures.

The polygon data, which are coordinate data of vertexes constituting the polygons, and the texture-selection data, which select textures corresponding to the polygons, are stored to be integrated.

Commands for rendering, generated by the CPU 6, include commands that use polygons to render three-dimensional images, and commands for rendering ordinary two-dimensional images.

Each command that uses polygons to render a three-dimensional image consists of a polygon-vertex-address data in the non-display area of the RAM 8; a texture-address data representing a position of the RAM 8 at which the texture data to be pasted on a polygon is stored; a color-address data representing a position in the display area of the RAM 8 at which the color data representing the color of a texture is stored; and a brightness data representing the brightness of the texture.

Among these data, the polygon-vertex-address data in the accumulation buffer of the RAM 8 is replaced with a two-dimensional polygon-vertex-coordinate data by using the signal processor 11 to perform, based on moving-quantity data and rotation-quantity data on a screen (viewpoint), coordinate transformation and the perspective projection transformation of polygon-vertex-coordinate data in a three-dimensional space from the CPU 6.

The two-dimensional polygon-vertex-address data represents an address in the display area of the RAM 8. The image processor 12 writes a texture data represented by a pre-assigned texture-address data in a range of the display area of the RAM 8 which is represented by three or four polygon-vertex-address data. Thereby, objects expressed by pasting textures on polygons are displayed on the screen of the TV monitor 2.

In accordance with an embodiment of the invention, the textures mapped onto the polygons and displayed on the monitor can be readily created in advance of game play by layering predefined grey-scale texture patterns and applying a desired color to the grey scale patterns, advantageously while the patterns are in the process of being layered. A method in accordance with an embodiment of the invention is now described, and which method provides textures utilized by the above described game machine in the manner given below.

Figures 2, 3:
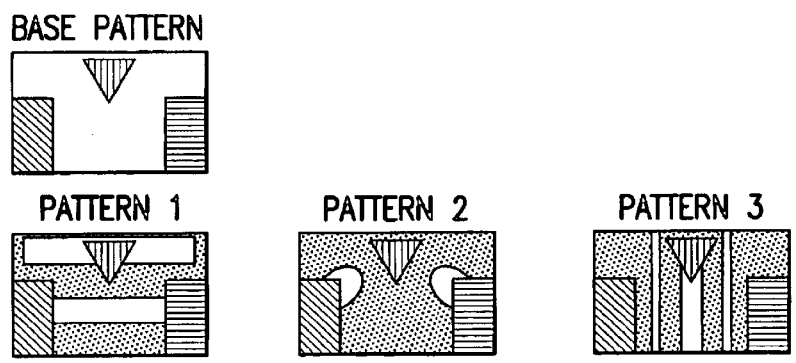
FIG. 2 is a representation of four grey-scale patterns as displayed, for example, on a monitor, prior to layering and color selection thereof.
FIG. 3 is a table visually outlining steps carried out in creating a finished team uniform by sequential layering and color selection of pre-stored patterns in accordance with an embodiment of the invention.

Turning now to FIGS. 2 and 3, an embodiment of the invention directed to a method of creating textures for display objects and suited for use, for example, with an apparatus of the general type disclosed above, will be described with reference to an example, selected for illustrative purposes only, in which the display object to be created is a uniform jersey for a game character. As shown in FIG. 2, the constituent layers which comprise the complete texture pattern defining the custom jersey are shown as a set of four patterns which include a base pattern, a pattern 1, a pattern 2 and a pattern 3. By sequentially layering each of the patterns in a desired order, for example, as shown in the table of FIG. 3, a completed texture pattern is created, as depicted in Step 4 (Resulting 2D pattern).

In accordance with the presently described example as applied to the game machine described above with reference to FIG. 1 the following steps are performed. Predefined pattern data are stored, for example, on the recording medium 5. The predefined pattern data are advantageously in the form of grey-scale design patterns, which thereby permit greater flexibility when selecting colors of each layer, as described more fully below, and consist of any desired shapes or regions which can be suitably combined in layers with other ones of such predefined design patterns to collectively create a texture pattern for the display object. By storing a wide variety of different predefined patterns identified by a particular pattern number, an almost limitless variation in created textures can be achieved by matching the many different combinations of such patterns. In the illustrated example, the first (lowest) layer consists of a base pattern comprised of an unpatterned background. The second layer which is placed over the base layer in step 2 of FIG. 3, is pattern 1, and is comprised of a pattern consisting of horizontal stripes. The third layer, i.e. pattern 2, is comprised of a pattern consisting of crescents adjacent the sleeves and is selected and applied in step 3. Finally, in step 4, the fourth (uppermost) layer is selected and applied and is pattern 3 consisting of vertical stripes.

Once these patterns have been predefined and stored, the actual process of creating a particular texture pattern (uniform design in the illustrative example) advantageously begins by selection of the first layer from the stored predetermined pattern data. The selected first pattern is suitably stored in memory, for example, in the above described apparatus embodiment, by utilizing an accumulation buffer included in the non-display area of RAM 8. In the illustrated example, the base pattern presenting an unpatterned background is selected and stored in the accumulation buffer, as shown in Step 1 of FIG. 2. Such a base pattern serves as a foundation for all subsequently layered patterns. A color is then selected by specifying the particular RGB value, which is applied to the pattern, in the present case the base pattern. The base pattern is then drawn into the accumulation buffer using the selected color. The next pattern to be layered over the base pattern is selected from the predetermined patterns and a color is selected for this pattern in the previously described manner. This layer is then also drawn into the accumulation buffer using the corresponding color data. The steps are repeated for a desired number of subsequently layered patterns (in the example, two additional layers) until a desired texture is achieved as a bitmapped image in the accumulation buffer. This bitmap data is later mapped onto a three-dimensional model or character image for display in the frame buffer.

The chart in FIG. 3 includes, by simplified example, the particular data representative of the RGB (Red, Green, Blue) value for each of the constituent patterns which have been layered to produce the finished texture shown in step 4. An RGB value of 255,255,0 indicates that yellow was selected as the color of the base pattern. Blue, having an RGB value of 0,0,255 was selected for subsequently applied pattern 1. As shown in step 2, the resulting 2D pattern is therefore blue horizontal stripes over a yellow background. Next, green was selected for the crescent pattern of pattern 2 in step 3, having an RGB value of 0,255,0. Finally, in step 4, red was selected for the vertical stripes of pattern 3, resulting in the depicted resulting 2D pattern representing the completed 2D texture. It is to be understood that further patterns could be applied over the layered patterns of the illustrated example, if so desired, without departure from the invention.

The various selections made in preforming the above described layering and color selection steps are implemented in practice by selection means for inputting a desired pattern or color selection. For example, when utilizing the method in accordance with an embodiment of the invention in the game system 1, described above and directed to home use, such selection means are conveniently, though not necessarily, located on the operation input unit, and may advantageously utilize shared components which perform various other actions during game play, and which may be toggled between pattern/color selection and game play operational modes according to conventional practice.

Once created, a texture pattern is optionally saved for future use as a custom-created texture advantageously by storing identifiers of the selected patterns and color data comprising the multi-layered texture, rather than as a bitmap image. When a stored texture is to be recreated, the stored data for all layers are re-drawn into the accumulation buffer, which recreates the bitmap image for active use. Advantageously, to reduce required memory, the pattern data comprise pattern numbers as identifiers associated with respective ones of the patterns. More advantageously, color data are stored as coordinate data on a color lookup table, or color chart. By so doing, the usually required 24 bits of memory required to save an RGB value is reduced to only 16 bits.

Figure 4:
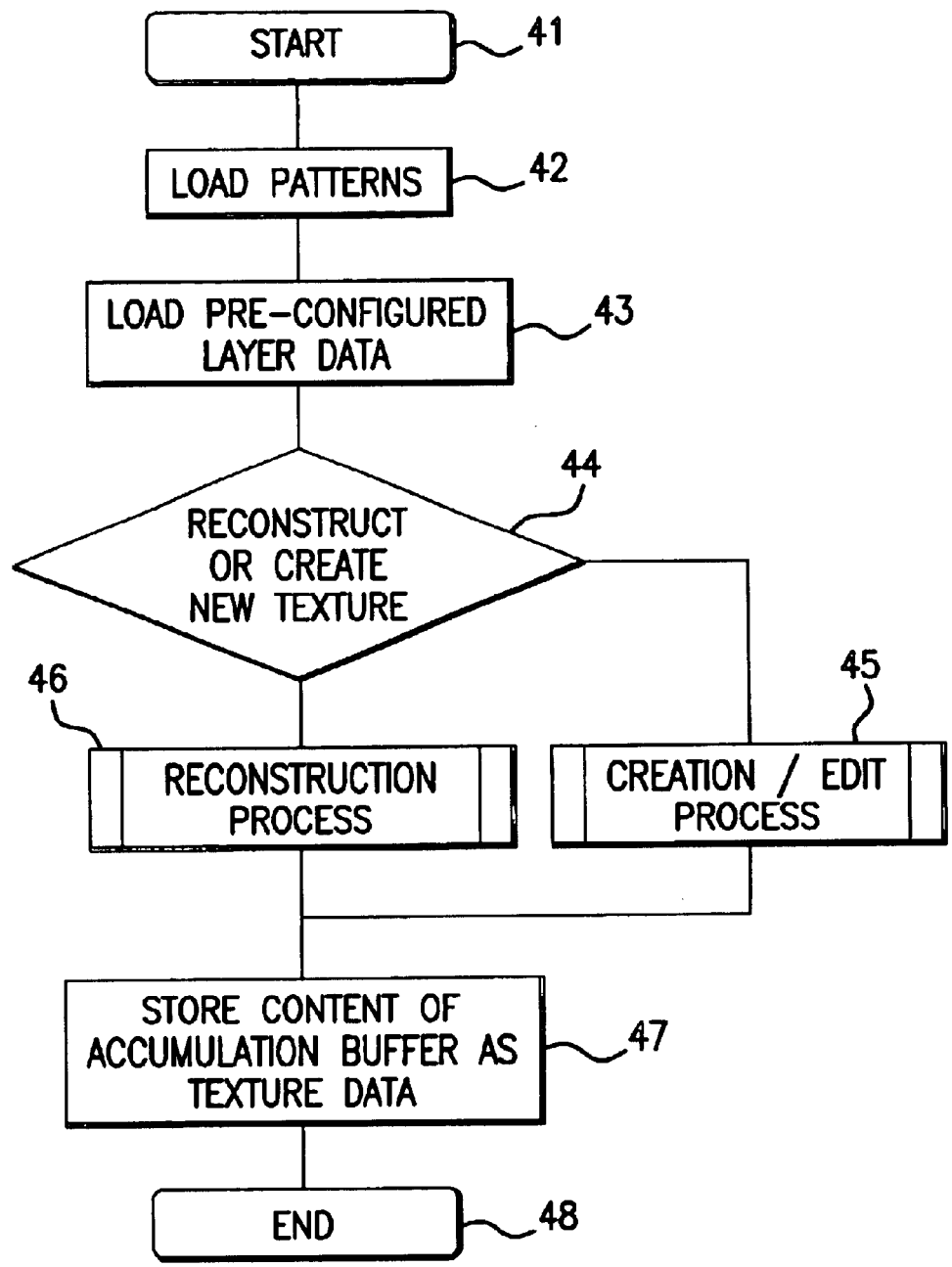
FIG. 4 is a flowchart of the display object creation process.
Figure 5:
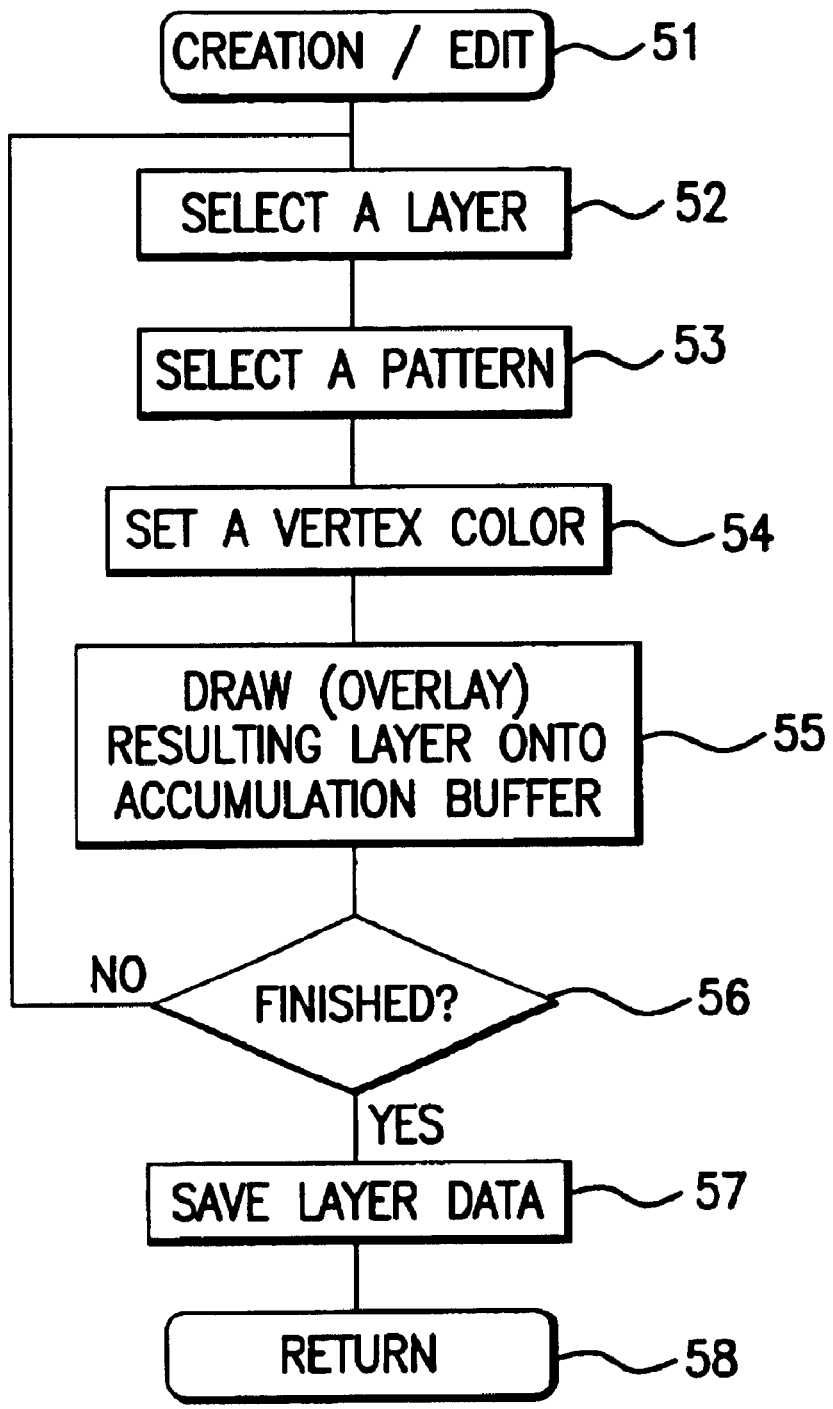
FIG. 5 is a flowchart of a creation and editing process.
Figure 6:
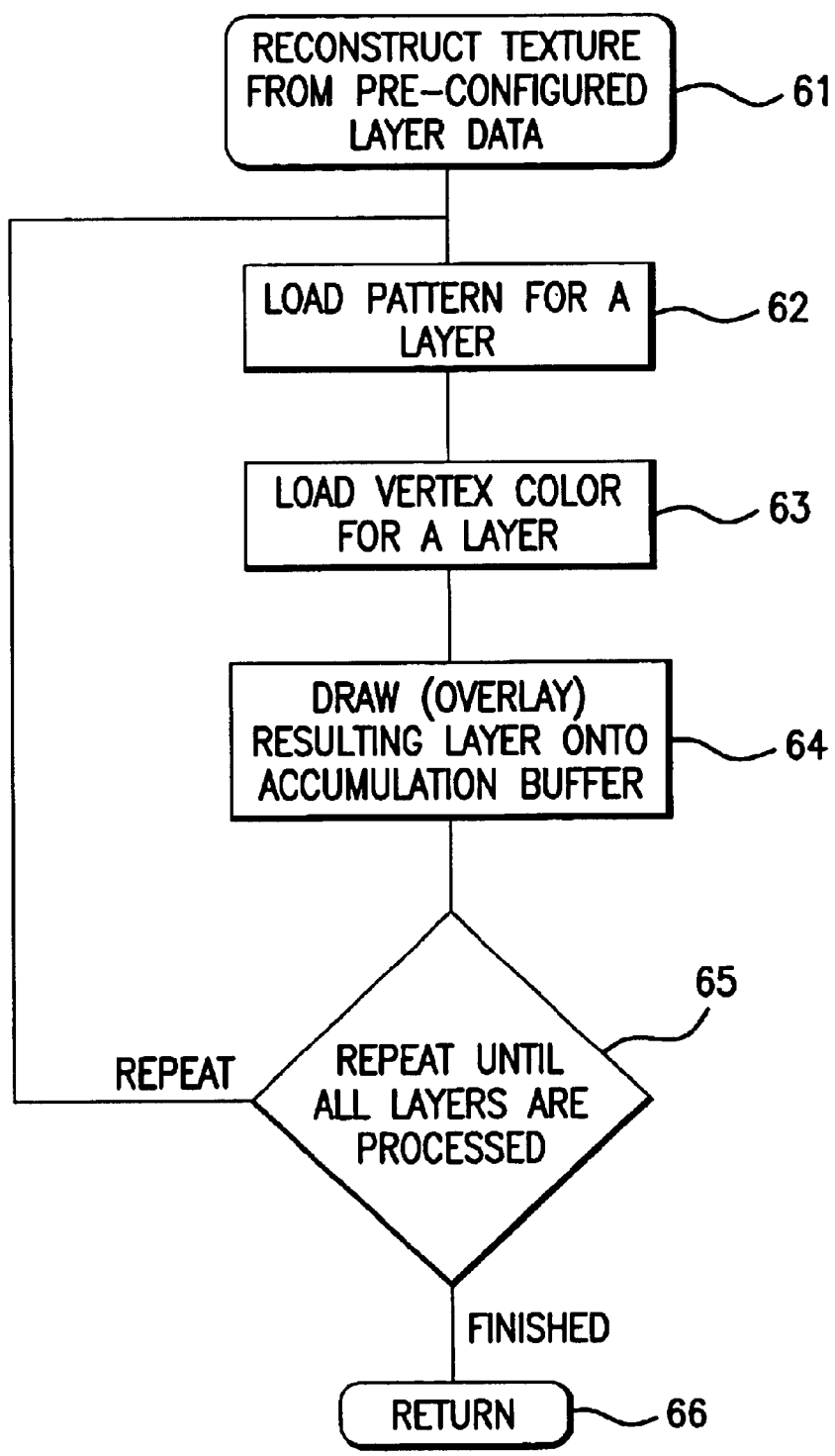
FIG. 6 is a flowchart of a reconstruction process.

Referring to FIGS. 4–6, a preferred embodiment of the present invention is presented in the form of flow charts which depict the high level operating procedures of the embodiment. In this particular embodiment a uniform for a game character is created by the user at the onset of the game. It is understood, as discussed below, that creating a uniform is merely an example and the process is not limited to creating uniform designs and can be applied to a configuration of any display object which is to be displayed. Initially the user selects the uniform creation process which starts of the display object creation process at step 41. Subsequently, operation proceeds to steps 42 and 43 wherein the texture patterns are loaded and pre-configured layer data is loaded. The pre-configured layer data may either be for uniform patterns previously created by the user or provided with the game as default patterns for users which do not wish to create customized uniforms. In step 44, the user provides input indicating whether pre-configured layer data is to be used or a new uniform is to be designed. If a new uniform is to be designed, the creation/edit process of step 45 is executed. If an already existing uniform design is to be used, the reconstruction process of step 46 is executed. The result of either step is that the desired pattern data is created in the accumulation buffer and in step 47 this data is then written to memory as texture data in bitmap form.

Referring to FIG. 5, the creation/edit process is initiated at step 51 when the routine is called following execution of decision step 44 of FIG. 4. The execution of the creation/edit process 45 will be discussed with reference to FIGS. 7A–7C in which customized logo creation is depicted and FIGS. 8A and 8B in which customized uniform creation is depicted. Whether a uniform, logo or other article is to be the subject of the process would be decided at the decision step 44.

Figure 7:
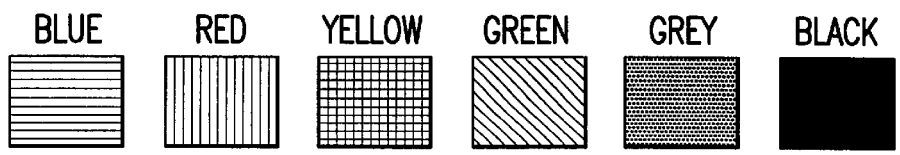
FIG. 7 presents a color table indicating color representations used in FIGS. 7A–7D and FIGS. 8A and 8B.
Figure 7A:
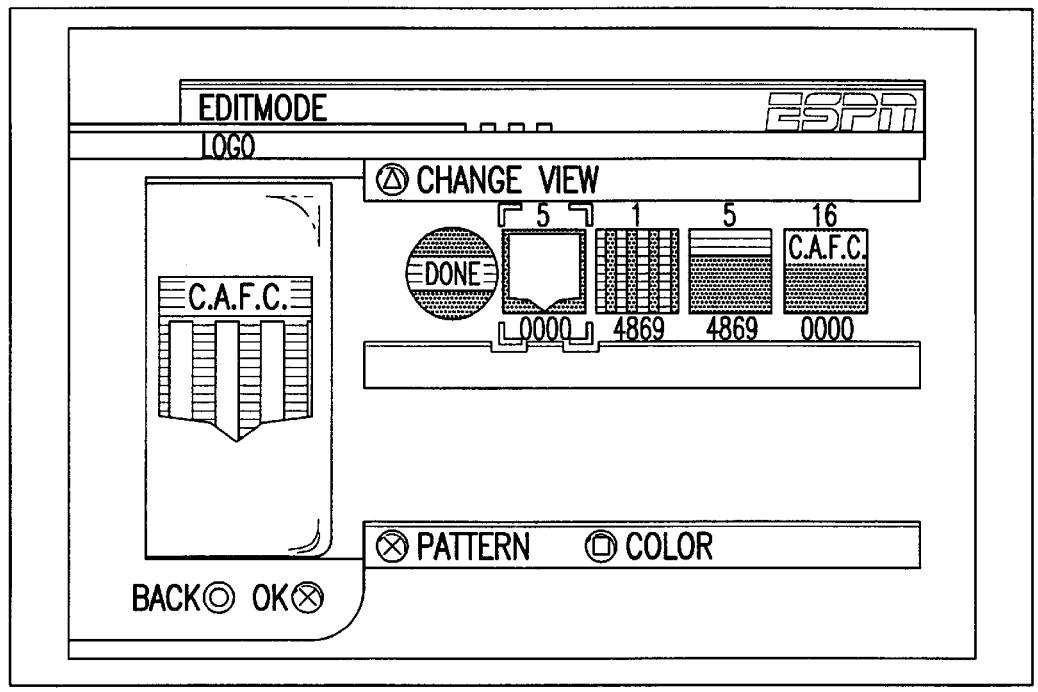
FIGS. 7A–7D are screen displays illustrating the creation editing process applied to logo creation.

An initial step is the layer selection of step 51. In this process the user can select which layer is to be edited or whether a further layer is to be added. For example, in FIG. 7A a base layer number 5 and subsequent pattern layers numbers 1, 5 and 16 are shown at in a top portion of the screen. The resultant logo is shown at a left side of the screen. In FIG. 7A the base layer 5 is selected as indicated by a frame around the base layer 5 which the user can move to different layers to effect layer selection or move to a blank to add a layer.

Figure 7B:
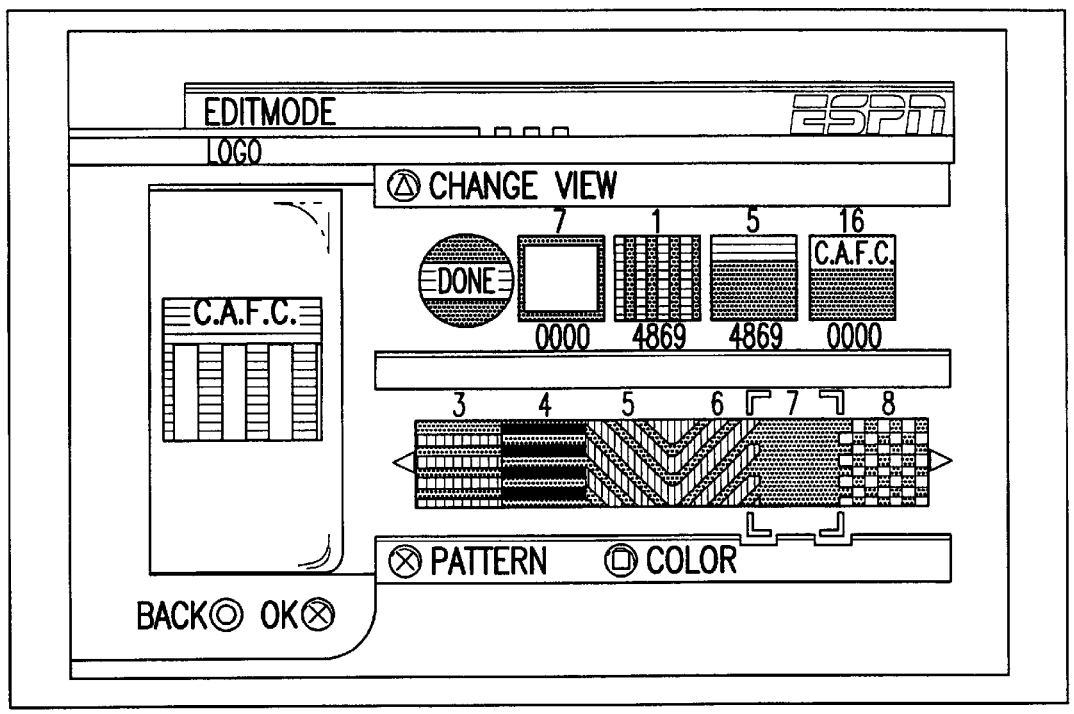

Once the layer is selected in step 52, the user activates the pattern select input and patterns appear in a lower portion of the screen. Again, the user moves a frame to select a desired pattern. As can be seen in FIG. 7B, the base pattern has now change as shown in the resultant logo at left. Selection is effected by operating an OK input shown at a lower left of the screen.

Figure 7C:
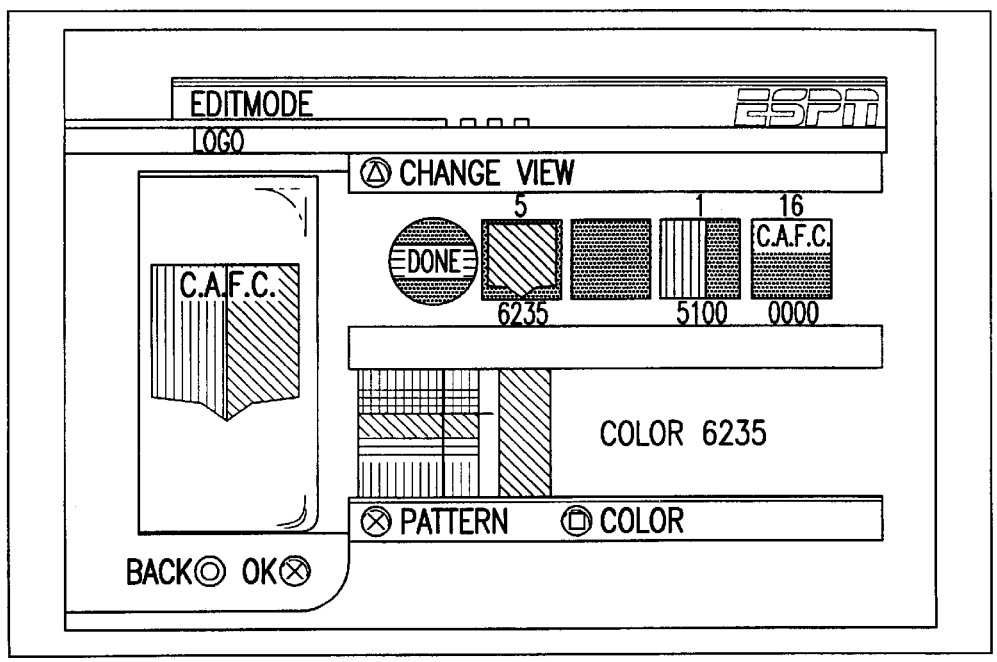
Figure 7D:
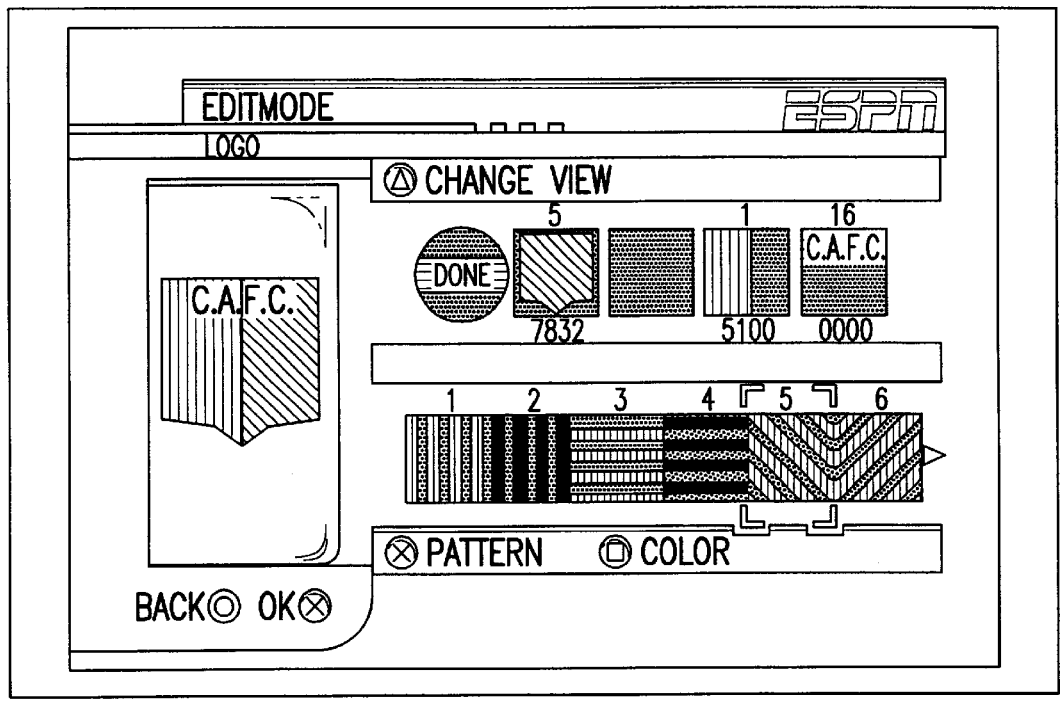

In step 54 the user next activates the color select input and a color chart appears as shown in FIG. 7C in a lower center portion of the screen. In the embodiment shown, a two dimensional color chart is used, however, an alternative embodiment is realizable wherein the user inputs individual RGB values. As previously noted, the two dimensional color chart allows color to be selected using two 8 bit data words representing coordinates on the color chart as opposed to using three 8 bit data words for RGB input values. The present embodiment uses to 8 bit data words to conserve storage space. Alternative embodiments may use greater or lesser number of bits as complexity and storage requirements dictate. The user manipulates cross hairs on the color chart to select a color which appears to the right of the color chart along with a color number 6235. Selection is effected by operating the OK input shown at the lower left of the screen. In the preferred embodiment the color selected is applied to the selected pattern as a vertex color. As noted below, the present invention is not considered limited to application to the vertex color.

In step 55 the resulting layer is drawn, or overlayed, into the accumulation buffer. In step 56, it is determined whether the logo is complete. The user activates a done input to indicate that the logo is complete and the layer data is stored in step 57. Alternatively, the user may select another layer, pattern and color repeating steps 52 through 55.

Figure 8A:
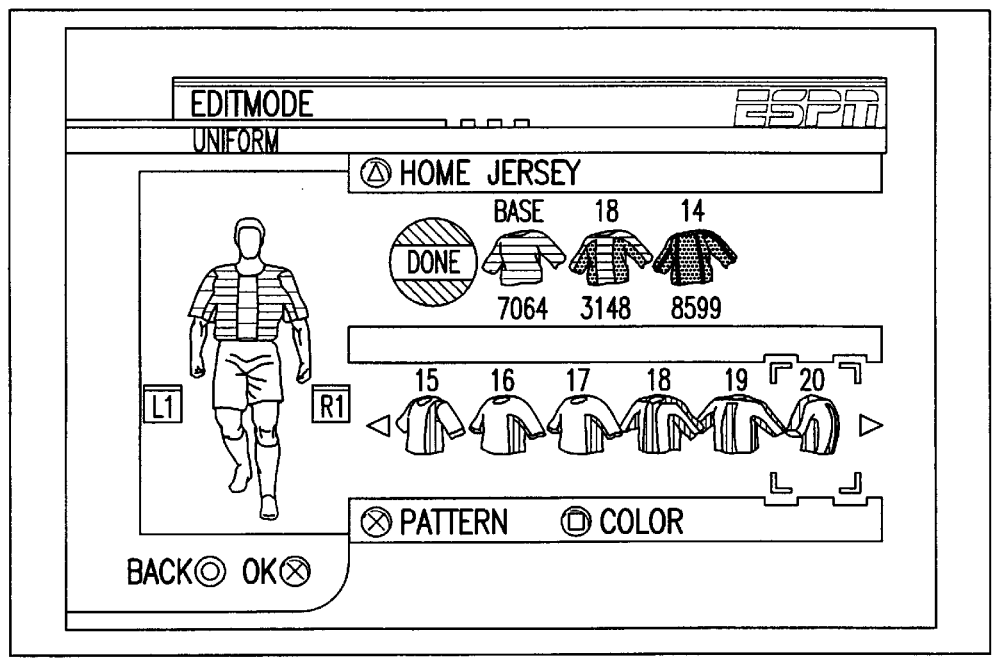
FIGS. 8A and 8B are screen displays illustrating the creation/editing process applied to uniform creation.
Figure 8B:
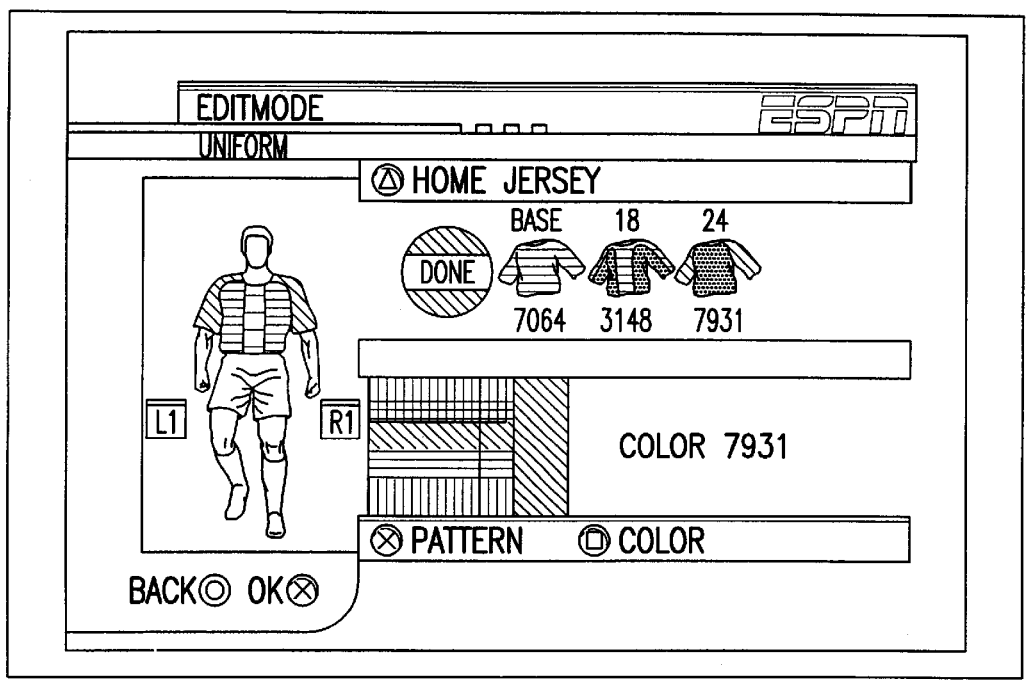

As previously noted, in the preferred embodiment the layer data comprise numbers identifying the patterns and colors selected along with an identifier for the particular logo, uniform, or, in general terms, the display object, along with an indication of the number of layers used. The data in the accumulation buffer is then written as bitmap texture data to be overlayed on polygons. If further layers are desired the user proceeds to select another layer repeating steps 52 through 55. FIGS. 8A and 8B depict the same process applied to uniform creation. While uniform and logo creation is described herein, it is understood that the invention is not limited to such items and is applicable to other display objects such as automobiles, planes, helmets, icons or any other item which may be utilized in a game, utility program, control program or other process requiring display of various images.

Referring to FIG. 6, the reconstruction process 46 is detailed in which a previously stored data for a display object is retrieved from memory and reconstructed into bitmapped data. In step 61 the user selects which of the previously stored display objects is to be reconstructed. The following steps 62, 63 and 64, respectively load the layer pattern, indicated by the stored identifier, and selected vertex color, indicated by the stored color chart number (coordinates), from memory and draw the layer into the accumulation buffer with the color applied thereto as a vertex color. In step 65 it is determined whether all layers of the selected display configuration have been loaded. If there are further layers to be loaded steps 62, 63 and 64 are repeated. It will be realized by those skilled in the art that the number of layers need not be limited to those presented in the examples provided herein. Furthermore, whether all layers have been loaded need not involve storing the number of layers for the configuration but may be determined using a delimiter indicating the last layer has been loaded or any other method known to those skilled in the art. Finally, once the last layer is loaded, the reconstruction process ends and returns to the uniform creation process of FIG. 4 wherein the contents of the accumulation buffer is then written as bitmap texture data in step 47.

Figure 9:
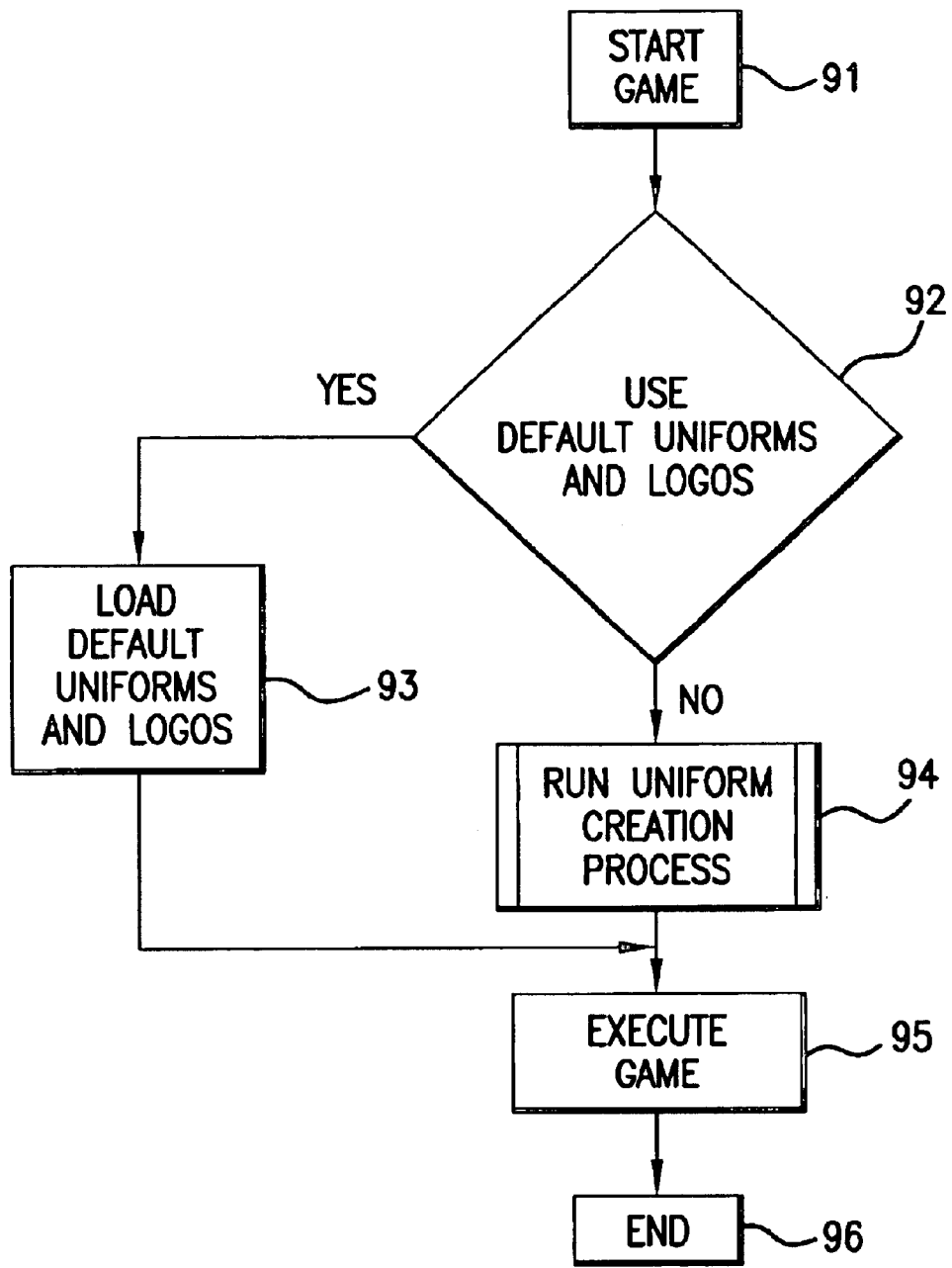
FIG. 9 is a flowchart illustrating incorporation of the display object creation process into a game application.

Referring to FIG. 9, an overview flowchart of the embodiment of the present invention as applied to a game is provided. In step 91 the user initiates the start of the game. Following the start, the user is prompted in step 92 to indicate whether default uniforms and logos, previously stored, are to be used or whether customized uniforms and logos or previously stored customized uniforms and logos are to be used. Default uniforms and logos are ones provided with the game software. If the user chooses to use the default uniforms and logos, step 93 is effected which loads those uniforms and logos as bitmap data. Alternatively, if the user chose to create customized uniforms and logos, or use previously created and stored customized uniforms and logos, step 94 runs the above display object creation process. Step 95 then executes the game program using the chosen uniforms and logos and the game ends at step 96. While this flow chart applies to a game, as discussed above, the process is applicable to other applications.

In the above discussed flowcharts the color of the selected layers is set by changing the vertex color. However, as previously noted, texture color can also be changed in accordance with the present invention. The preferred embodiment of the present invention changes the vertex colors to achieve greater efficiency as detailed below.

Figure 10:
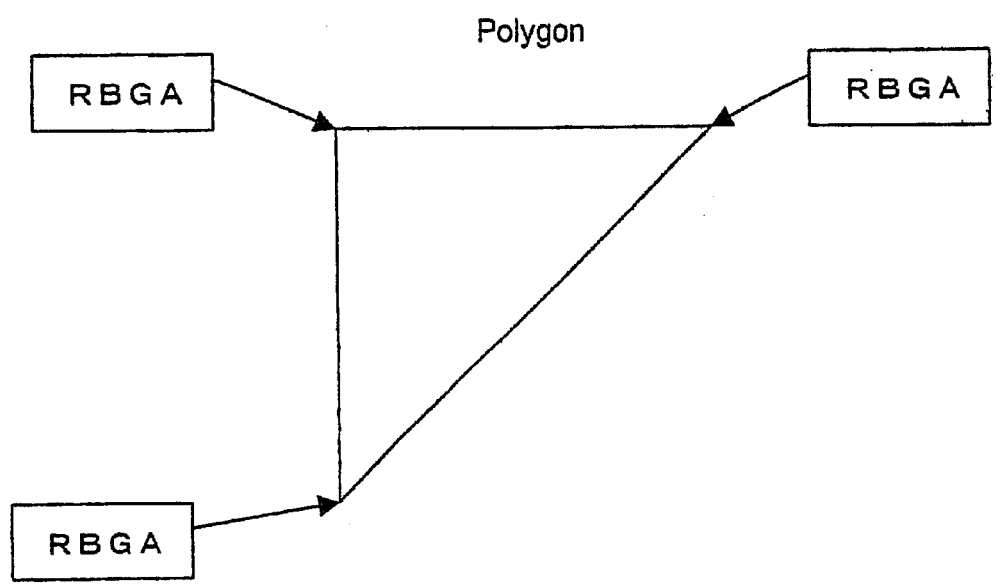
FIG. 10 illustrates a polygon configuration.

Referring to FIG. 10, a polygon is shown having three vertexes each of which has RGBA (red, green, blue, aplha) data associated with it. The alpha data indicates the opacity of the color. If only one vertex is provided with an RGBA value, all the vertexes will be associated with that value and the polygon will have a single flat color. If each of the vertexes are provided with different RGBA values, the polygon will have a color gradation.

The present invention can theoretically achieve the same results changing either the vertex color or the texture color. However, the preferred embodiment changes the vertex color which is significantly more efficient than changing the texture color. Consider the following analogy wherein there are 256 cans of watercolor paint, each in different color, and a picture is made on a white canvas, using all 256 colors. If it is decided that overall picture needs a bluish tint, one could add blue paint to all 256 cans and redraw the entire picture. The orange will be bluish orange, the green will be a bluish green and so forth. This involves considerable effort and is analogous to changing the texture colors.

Changing the vertex color is analogous to exchanging the white canvas with a blue canvas. When a texture is mapped on to a polygon, the color of the texture and the color of the vertex go through a blending process called multiplication. The resulting color of a multiplication is a darker color. Multiplying any color with black produces black and multiplying any color with white leaves the color unchanged.

Thus, the preferred embodiment changes the vertex colors because it leaves less room for mistakes. Although the same results can be provided through both methods, manipulation through vertex color requires only a single process, against 256 processes. Even a single mistake in one of the 256 processes can alter the end result when manipulating the image through texture colors. However, unless identified otherwise in the appended claims, the scope of present invention is considered to encompass both methods.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims. For example, such changes may include omitting various features of the present invention described above, however, the omission of such features is not considered as departing from the scope of the appended claims unless such features are expressly recited in the claims. Furthermore, substitution of alternative implementations of features described above and referenced in the claims are to be considered within the scope of the claims where such alternative implementations are analogous in function and not contrary to the claim language.

What is claimed is:

1. A method for creating a texture for a display object to be displayed using computer graphics, comprising:

storing predefined textured patterns;

selecting a first textured pattern from said predefined textured patterns;

selecting and applying a first color to said first textured pattern;

storing said first textured pattern with said first color applied thereto in an accumulation buffer;

selecting at least a second textured pattern from said predefined textured patterns;

selecting and applying at least a second color respectively to said at least a second textured pattern;

storing said at least a second textured pattern with said at least a second color applied thereto in said accumulation buffer to effect overlaying of said first and second at least a textured patterns; and writing from said accumulation buffer a bitmapped image representative of the overlayed first textured pattern and said at least a second textured pattern for subsequent mapping onto a three-dimensional model of the display object.

2. The method of claim 1 further comprising:

storing pattern identifiers of said first textured patterns and said at least one second textured patterns and color identifiers of said first and at least a second colors applied thereto; and reconstructing said bitmapped image by reading said pattern identifiers and said color identifier and re-layering said first textured patterns and said at least one second textured patterns with said first and at least a second colors applied thereto.

3. The method according to claim 2 wherein said first and at least a second colors are applied as vertex colors.

4. The method according to claim 3 wherein said first and at least a second colors are applied as vertex colors are selected using a two dimensional color chart.

5. The method according to claim 4 further comprising:

said display object being a uniform of a character in a video game;

permitting creation of said bitmapped image by a player of the video game at a start of the video game; and mapping said bitmapped image onto a three-dimensional model of the uniform of the character during game play.

6. The method according to claim 1 wherein said first and at least a second colors are applied as vertex colors.

7. The method according to claim 6 wherein said first and at least a second colors are applied as vertex colors are selected using a two dimensional color chart.

8. The method according to claim 7 further comprising:

said display object being a uniform of a character in a video game;

permitting creation of said bitmapped image by a player of the video game at a start of the video game; and mapping said bitmapped image onto a three-dimensional model of the uniform of the character during game play.

9. The method according to claim 1 further comprising:

said display object being a uniform of a character in a video game;

permitting creation of said bitmapped image by a player of the video game at a start of the video game; and mapping said bitmapped image onto a three-dimensional model of the uniform of the character during game play.

* * * * *